UNITED STATES PATENT OFFICE.

PHILIP NICKOLS, OF ALBANY, NEW YORK.

COMPOUND FOR MAKING CIDER.

SPECIFICATION forming part of Letters Patent No. 536,888, dated April 2, 1895.

Application filed December 14, 1894. Serial No. 531,841. (No specimens.)

*To all whom it may concern:*

Be it known that I, PHILIP NICKOLS, of the city and county of Albany, State of New York, have invented a new and Improved Compound for Making Cider, of which the following is a full, clear, and exact description.

This invention consists in a new and useful compound or composition of matter to be used for making cider, and whereby an improved cider, free from objectionable or deleterious ingredients is or may be produced.

The compound consists of the following ingredients combined in or about the proportions stated, viz: burned apple peels, one-half ounce; blackberries, one-fourth ounce; pokeberries, one-fourth ounce; sugar, one ounce; tartaric-acid, one and one-fourth ounces; oil of apples, ten drops, and water in quantities to suit, substantially as hereinafter specified.

In preparing this compound, I first take an aluminum sauce pan, put in the burned apple peels, blackberries, pokeberries and sugar, as above named, and boil the same in about three ounces of water till the whole is of red color. It soon will boil dry. Then I let it fry slowly for ten minutes or longer until the red color turns to dark brown, then add about five ounces of water and boil for about two minutes, then press out the juice formed by the mixture, and put in the tartaric acid, boil until dissolved, and after the whole has cooled, add the oil of apples.

The oil of apples employed by me is preferably prepared by distillation from apple peels or skins, and after the process of distillation has been completed the residue from the retort is dried and constitutes the burned apple peels or skins employed for coloring the cider. The oil of apples thus prepared is much preferable to commercial oil of apples, which consists usually of ethyl and amyl valerates contaminated with sulphuric ether, which compound is not present in the oil of apples prepared as above described.

In using this compound to make the cider, I first take about two and three-quarters gallons of warm water, and dissolve it in about two and a half pounds of sugar, and then take a four ounce bottle filled with the above described cider making compound and mix its contents with the sugar and water last named, and after this put in the mass about one-quarter of an ounce, light weight, of yeast, compressed yeast being preferred. The whole mixture is then stirred well and put into bottles, kegs or jugs, filling them to the top and placing them in a warm place uncorked for about three days. On the following or fourth day, these vessels should be corked up and put on ice or in a cool place.

Cider thus made does not get sour or hard, and makes a delightful drink both in summer and winter; is free from objectionable chemicals to cause fermentation, the sugar, tartaric acid, water and yeast which will ferment, turning the sugar into grape sugar and other constituents and giving the cider a finer flavor than if made from juice pressed out of apples, owing to the absence of the malic acid present in ordinary apple cider which imparts the harsh taste thereto. The oil of apples gives a fine aroma to the beverage and the juice from the berries and apple peels gives to it the desired brown color and helps to improve the flavor. The ingredients here used for giving to the beverage its brown color, unlike other ingredients, are perfectly healthy and superior to burned sugar which settles at the bottom when fermenting, and the burned apple peels employed for the coloring contain a certain percentage of dextrine which serves to replace the dextrine present in ordinary apple cider, and there is no necessity to introduce foreign, poisonous or health destroying ingredients to keep the cider sweet, as is so often done with cider made by pressing the juice from apples.

Having thus described my invention, I claim as new and desire to secure by Letters Patent—

The herein-described composition of matter, consisting of sugar, tartaric acid, oil of apples, water, and burned apple peels, substantially as and in the proportions specified.

PHILIP NICKOLS.

Witnesses:
GEORGE A. SMITH,
FREDERICK W. COOK.